US005600448A

United States Patent [19]
Fisher

[11] Patent Number: 5,600,448
[45] Date of Patent: Feb. 4, 1997

[54] APPARATUS AND METHOD FOR GENERATING A SCREENED REPRODUCTION OF AN IMAGE

[75] Inventor: Gil Fisher, Petach Tikva, Israel

[73] Assignee: Scitex Corporation Ltd., Herzliya, Israel

[21] Appl. No.: 233,301

[22] Filed: Apr. 25, 1994

[30] Foreign Application Priority Data

Apr. 27, 1993 [IL] Israel ........................................ 105530

[51] Int. Cl.$^6$ ............................................................ H04N 1/40
[52] U.S. Cl. ............................................ 358/456; 358/454
[58] Field of Search ............................ 358/456, 463, 358/454, 457–459

[56] References Cited

U.S. PATENT DOCUMENTS

| | | | |
|---|---|---|---|
| 4,456,924 | 6/1984 | Rosenfeld | 358/75 |
| 4,556,918 | 12/1985 | Yamazaki et al. | 358/283 |
| 4,635,131 | 1/1987 | Terada, et al. | 358/296 |
| 4,763,199 | 8/1988 | Suzuki | 358/456 |
| 4,825,298 | 4/1989 | Ikuta et al. | 358/298 |
| 5,079,721 | 1/1992 | Gershony | 395/132 |
| 5,321,525 | 6/1994 | Hains | 358/456 |
| 5,367,613 | 11/1994 | Kurata et al. | 358/454 |
| 5,371,612 | 12/1994 | Sakamoto | 358/456 |
| 5,438,431 | 8/1995 | Ostromoukhov | 358/456 |
| 5,442,461 | 8/1995 | Levien | 358/456 |

FOREIGN PATENT DOCUMENTS

| | | | |
|---|---|---|---|
| 105343 | 4/1993 | Israel . | |
| 2157119 | 3/1985 | United Kingdom | H04N 1/00 |

*Primary Examiner*—Stephen Brinich
*Attorney, Agent, or Firm*—Ladas & Parry

[57] ABSTRACT

An apparatus is disclosed for generating a screened reproduction of an image having a scanner and a CPU receiving input density values of an original and coordinate information and storing screening information for providing an operating input to a plotter enabling the plotter to provide a screened image of the original. The CPU is operative to modify at least one of the input density values, the coordinate information and the screening information, thereby to provide an operating input generally free of repeated artifacts arising from the lack of coordination between the coordinate systems of the plotter and those of the screening information. This is achieved, in particular, by maintaining a uniform number of plotter lines in each dot of the screened image for a given input density.

12 Claims, 12 Drawing Sheets

APPARATUS AND METHOD FOR GENERATING A SCREENED REPRODUCTION OF AN IMAGE

FIELD OF THE INVENTION

The present invention relates to screened image reproduction and more particularly to a method and apparatus for electronically generating a screened reproduction of an image.

BACKGROUND OF THE INVENTION

Electronic screening for image reproduction is well known in the art. According to a well known technique described in U.S. Pat. No. 4,456,924 of the present assignee, for each screened dot, a multiplicity of coordinates of a laser plotter are translated into screen-cell coordinates. A corresponding cell memory is preloaded by threshold values, defining a cell memory matrix. Input digitized scanned density values of an image, such as a color separation, are compared with the threshold values, cell by cell. The results provide an on/off control input for a laser plotter.

U.S. Pat. No. 4,635,131 describes a method of and apparatus for producing halftone dot film of graduated density distribution. In an electronic image reproduction system, a halftone dot film of a density distribution of a specific pattern is produced by obtaining a value 1 expressed by an equation $1=f(x)+g(y)$ representative of the specific pattern corresponding to the density value. By superimposing a density signal corresponding to the value 1 on an image signal developed by scanning an original, a reproduction image of the original, modulated by the density signal of a specific pattern, is obtained.

U.S. Pat. No. 4,825,298 to Ikuta and Murai describes a technique for generating a screened reproduction of an image in which the density distribution of a given screen dot is expressed in three dimensions, wherein the area of the screen dot is expressed along X and Y axes and the density is expressed along a Z axis perpendicular thereto. A film coordinate generator generates film coordinates (u,v), corresponding to the position of an exposure beam on a recording film which position is detected by encoders. The film coordinates are in turn supplied to a screen coordinate generator to be converted into virtual screen coordinates (x,y). A beam control signal generator receives the coordinates (x,y) and an image signal corresponding to the position of the exposure beam to output a beam control signal indicating lighting of the exposure beam when one of the coordinates (x,y) is between upper and lower limit values, corresponding to the same, which are previously determined for each combination of the other of the coordinates (x,y) and the density value of the image signal.

U.K. Published Patent Application 2,157,119A to Ikuta describes apparatus which operates similarly to the technique of U.S. Pat. No. 4,456,924 but does not employ a matrix memory. Instead, the threshold function is calculated on the fly in real time or near real time. This apparatus is limited to relatively simple dot configurations.

U.S. Pat. No. 4,556,918 describes a method and apparatus for generating screened halftone images which includes means for assuming an area of halftone dots with desired periodicity and tone reproducibility, subdividing the area into minute cells and setting address values for each of the minute cells, computing out a threshold value of density for each of the cells as a function of the relevant address values and using the computed value as a threshold value of density for the cell, apparatus for obtaining a density-related video signal of the portion of the original corresponding to each of the cells by scanning the original, and apparatus for producing halftone dot signals by comparing the video signals and the threshold value of density with each other.

Applicant/assignee's earlier U.S. Pat. No. 5,079,721 describes apparatus and a technique for generating a screened reproduction of an image including the steps of providing a representation of an original having input density values representing the grey levels of various locations of the original for a given color separation, defining a desired screen dot arrangement for the image, writing screen dots in a line by line fashion, wherein each screen dot is made up of a plurality of lines whose length and location determines the dot configuration and whose length and location is determined by an analog operation employing the input density values of the original and the desired screen dot arrangement.

SUMMARY OF THE INVENTION

The present invention seeks to provide an improved technique and apparatus for generating a screened reproduction of an image.

There is thus provided in accordance with a preferred embodiment of the present invention apparatus for generating a screened reproduction of an image comprising:

apparatus receiving input density values of an original and coordinate information and storing screening information for providing an operating input to a plotter enabling the plotter to provide a screened image of the original, the apparatus being characterized in that it includes apparatus for modifying at least one of the input density values, the coordinate information and the screening information, thereby to provide an operating input generally free of repeated artifacts arising from the lack of coordination between the coordinate systems of the plotter and those of the screening information.

There is also provided in accordance with a preferred embodiment of the present invention apparatus for generating a screened reproduction of an image comprising:

a plotter apparatus receiving input density values of an original and coordinate information and storing screening information for providing an operating input to the plotter enabling the plotter to provide a screened image of the original, the apparatus being characterized in that it includes apparatus for modifying at least one of the input density values, the coordinate information the operational characteristics of the plotter and the screening information, thereby to provide an operating input generally free of repeated artifacts arising from the lack of coordination between the coordinate systems of the plotter and those of the screening information.

Preferably the apparatus for modifying is operative to maintain a uniform number of plotter lines in each dot for a given input density.

Preferably the apparatus for modifying is also operative to maintain the center of each dot at a uniform location within the dot for a given input density.

Additionally, the apparatus for modifying preferably is operative to maintain the percentage of exposed area per dot uniform for each given input density.

Preferably the apparatus for modifying is operative to maintain a uniform number of plotter lines in each group of dots for a given input density.

Preferably the apparatus for modifying is also operative to maintain the center of each group of dots at a uniform location within the group of dots for a given input density.

Additionally, the apparatus for modifying preferably is operative to maintain the percentage of exposed area per group of group of dots uniform for each given input density.

Further in accordance with an embodiment of the present invention there is provided a method for generating a screened reproduction of an image comprising the steps of:

receiving input density values of an original and coordinate information and storing screening information for providing an operating input to a plotter enabling the plotter to provide a screened image of the original, the method being characterized in that it includes the step of modifying at least one of the input density values, the coordinate information and the screening information, thereby to provide an operating input generally free of repeated artifacts arising from the lack of coordination between the coordinate systems of the plotter and those of the screening information.

There is also provided in accordance with a preferred embodiment of the present invention a method for generating a screened reproduction of an image comprising receiving input density values of an original and coordinate information and storing screening information for providing an operating input to a plotter enabling the plotter to provide a screened image of the original, the method being characterized in that it includes the step of modifying at least one of the input density values, the coordinate information the operational characteristics of the plotter and the screening information, thereby to provide an operating input generally free of repeated artifacts arising from the lack of coordination between the coordinate systems of the plotter and those of the screening information.

Preferably the step of modifying is operative to maintain a uniform number of plotter lines in each dot for a given input density.

Preferably the step of modifying is also operative to maintain the center of each dot at a uniform location within the dot for a given input density.

Additionally, the step of modifying preferably is operative to maintain the percentage of exposed area per dot uniform for each given input density.

Preferably the step of modifying is operative to maintain a uniform number of plotter lines in each group of dots for a given input density.

Preferably the step of modifying is also operative to maintain the center of each group of dots at a uniform location within the group of dots for a given input density.

Additionally, the step of modifying preferably is operative to maintain the percentage of exposed area per group of group of dots uniform for each given input density.

BRIEF DESCRIPTION OF THE DRAWINGS

The present invention will be more fully understood and appreciated from the following detailed description, taken in conjunction with the drawings in which.

DETAILED DESCRIPTION OF A PREFERRED EMBODIMENT

Figure 1:
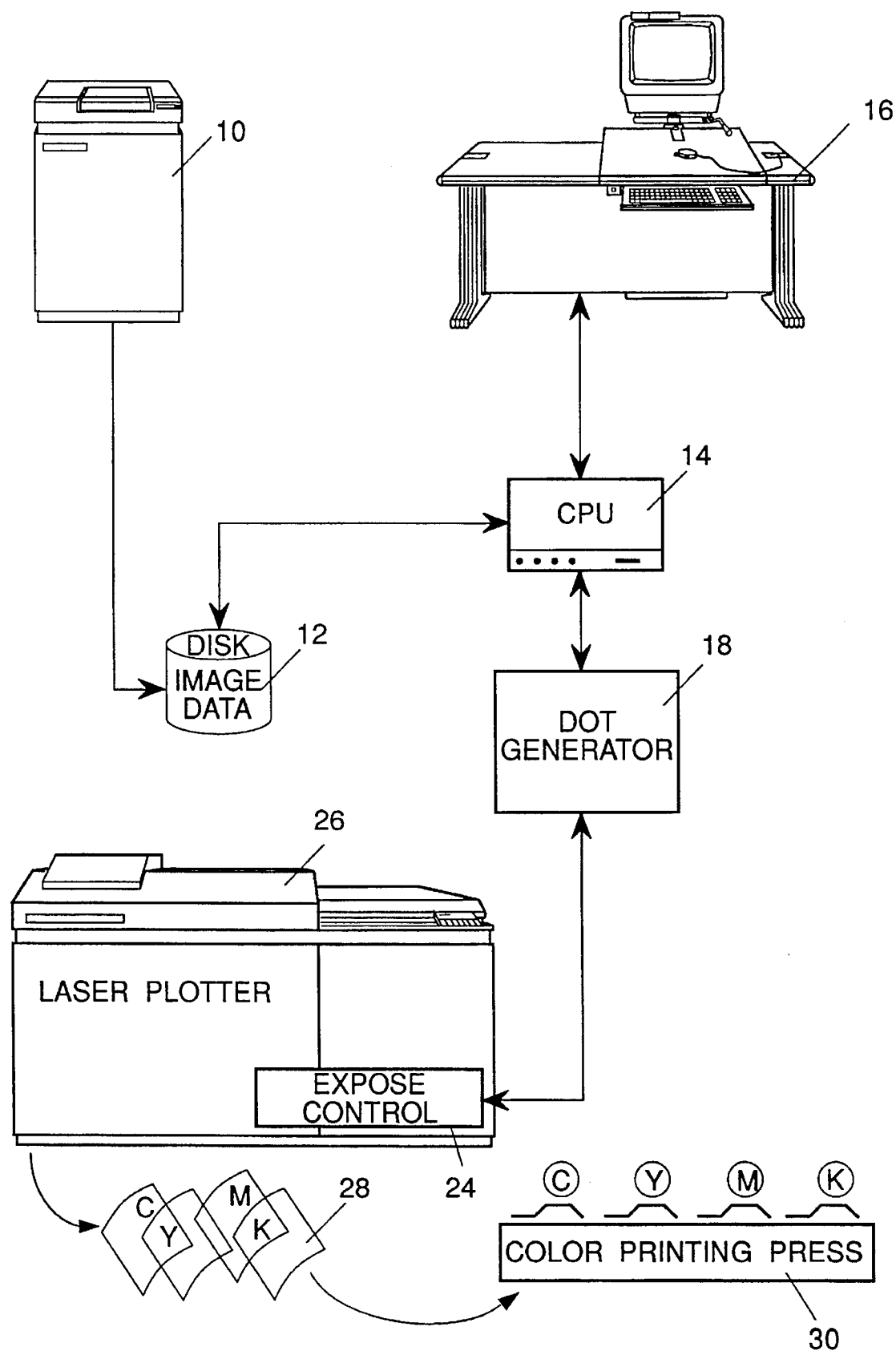
FIG. 1 is a simplified block diagram illustration of a process color printing system constructed and operative in accordance with a preferred embodiment of the present invention.

Reference is now made to FIG. 1, which illustrates a system for generating a screened reproduction of an image constructed and operative in accordance with a preferred embodiment of the present invention. The system preferably comprises a color separation scanner 10, such as a Scitex Smart Scanner, manufactured and sold by Scitex Corporation Ltd. of Herzlia, Israel, which is adapted to provide a digital color separation output of a color original.

The digital output of scanner 10 is normally stored on an image data disk 12 or any other suitable storage medium, which is accessible by a CPU 14, such as an Intel 80486. Interfacing with the CPU 14 is an interactive workstation 16, such as a Scitex Prisma, manufactured and sold by Scitex Corporation Ltd. of Herzlia, Israel.

CPU 14 interfaces with screen dot generation circuitry 18, which in turn provides a control output to laser beam control circuitry 24 in a laser plotter 26, such as a Raystar, manufactured and sold by Scitex Corporation Ltd. of Herzlia, Israel. Dot generation circuitry 18 should be constructed to permit variation of the dot shape as a function of the input density and of the plotter coordinates. Dot generation circuitry which is suitable is described in Israel Patent Application 105343 filed Apr. 4, 1993 and U.S. patent application Ser. No. 07/947,282, filed Sep. 16, 1992.

Laser plotter 26 produces halftone film color separations 28 which are employed in a conventional process color printing press 30, to produce process color prints.

Figure 2:
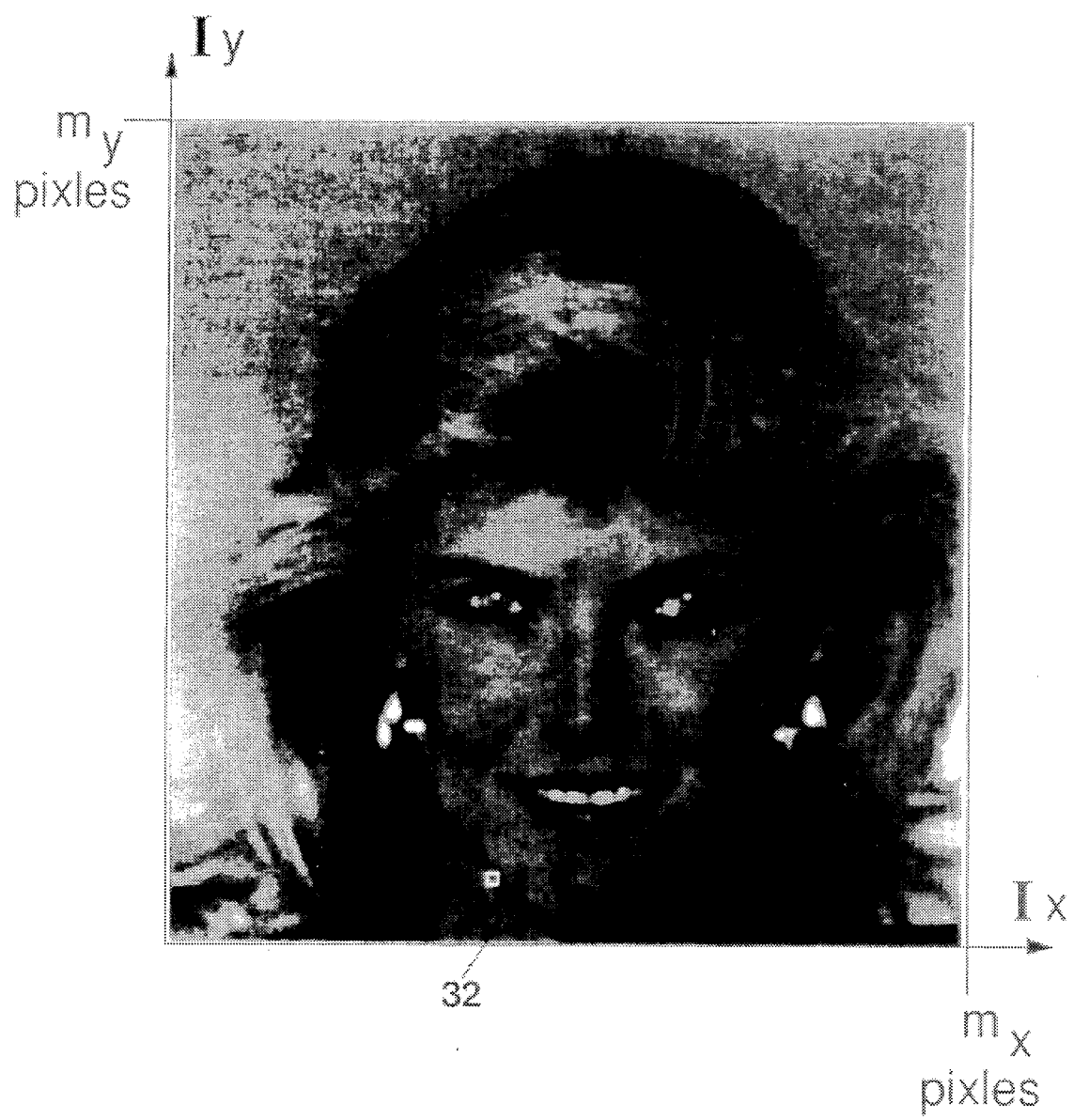
FIG. 2 is an illustration of one color separation of a typical color original.
Figure 3:
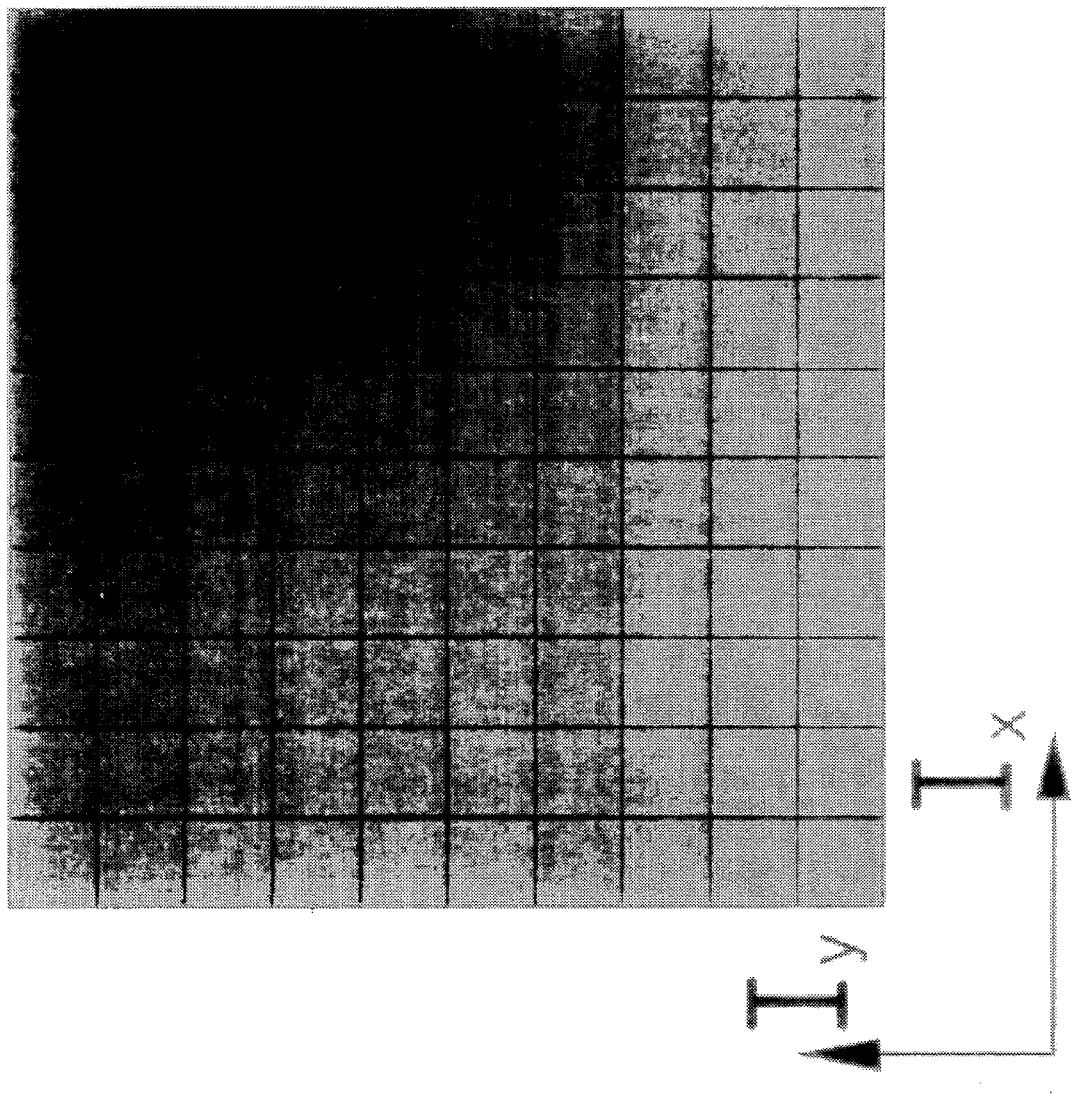
FIG. 3 is an enlarged illustration of a small portion of the halftone color separation of FIG. 2.

Reference is now made to FIGS. 2 and 3. FIG. 2 illustrates a typical halftone color separation which is stored on disc 12. FIG. 3 illustrates in enlarged detail, a small area 32 indicated on FIG. 2. It is noted that the gray level over area 32 varies thereacross.

The halftone color separation in general and the small area 32 in particular are hereinafter termed the input image and are divided into a first multiplicity of pixels 34 which are arranged along coordinate axes $I_x$ and $I_y$. Pixels 34 typically have a resolution of 100–400 pixels per inch along each of the coordinate axes of the input image.

Figure 4:
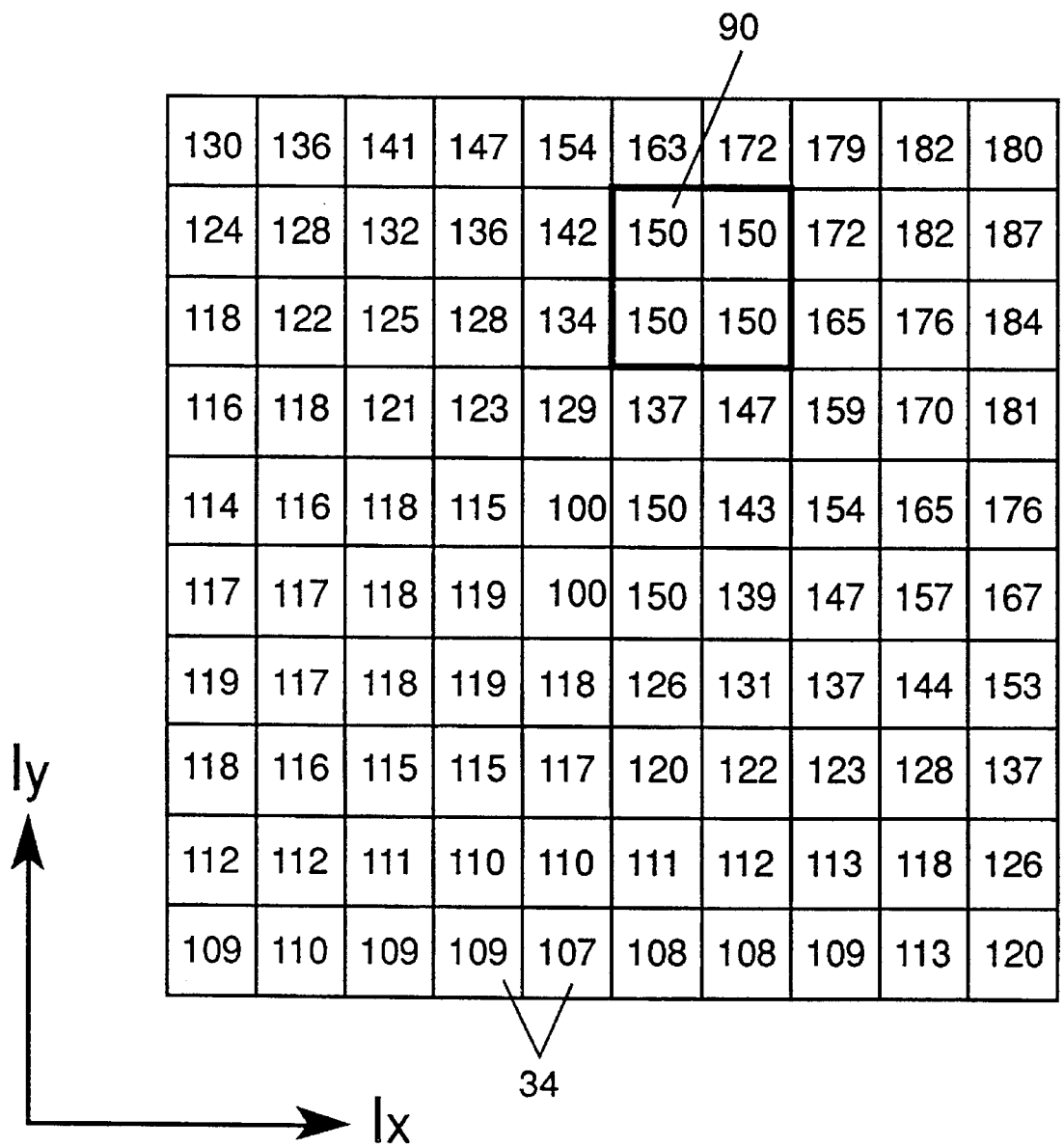
FIG. 4 is an illustration of pixel-by-pixel input density values for the small portion of the color separation of FIG. 2.

Each average gray level for a pixel 34 is represented digitally by an input density level. There are typically provided 256 different input density levels, 0 being the lightest and 255 being the blackest. FIG. 4 illustrates the input density values for the pixels 34 of FIG. 3.

In accordance with a preferred embodiment of the present invention, the CPU 14 is operative to modify the dot shape produced by the dot generator 18 so as to eliminate repeated artifacts arising from the lack of coordination between the coordinate systems of the plotter 26 and those of the screening information.

Figure 5:
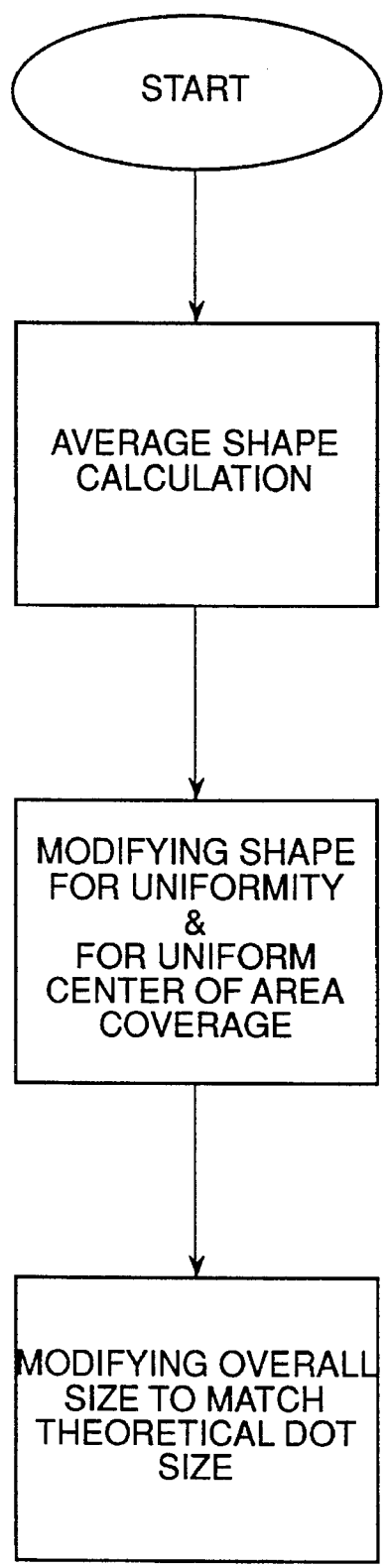
FIG. 5 is a generalized flow chart illustrating operation of the invention.

Reference is now made to FIG. 5 which illustrates the present invention in general terms. Generally speaking, the invention comprises the following principal functions:

A. calculating the average shape of one dot or a group of dots;

B. modifying the shape of the dot or group of dots to have greater uniformity in general and more particularly to have a uniform center of area coverage;

C. modifying the overall size of the dot or group of dots in order to more closely match the theoretical dot size determined by the input density of the original.

The foregoing steps are preferably carried out by software in the CPU, it being appreciated that the invention could equally have a hardware implementation.

Figure 6:
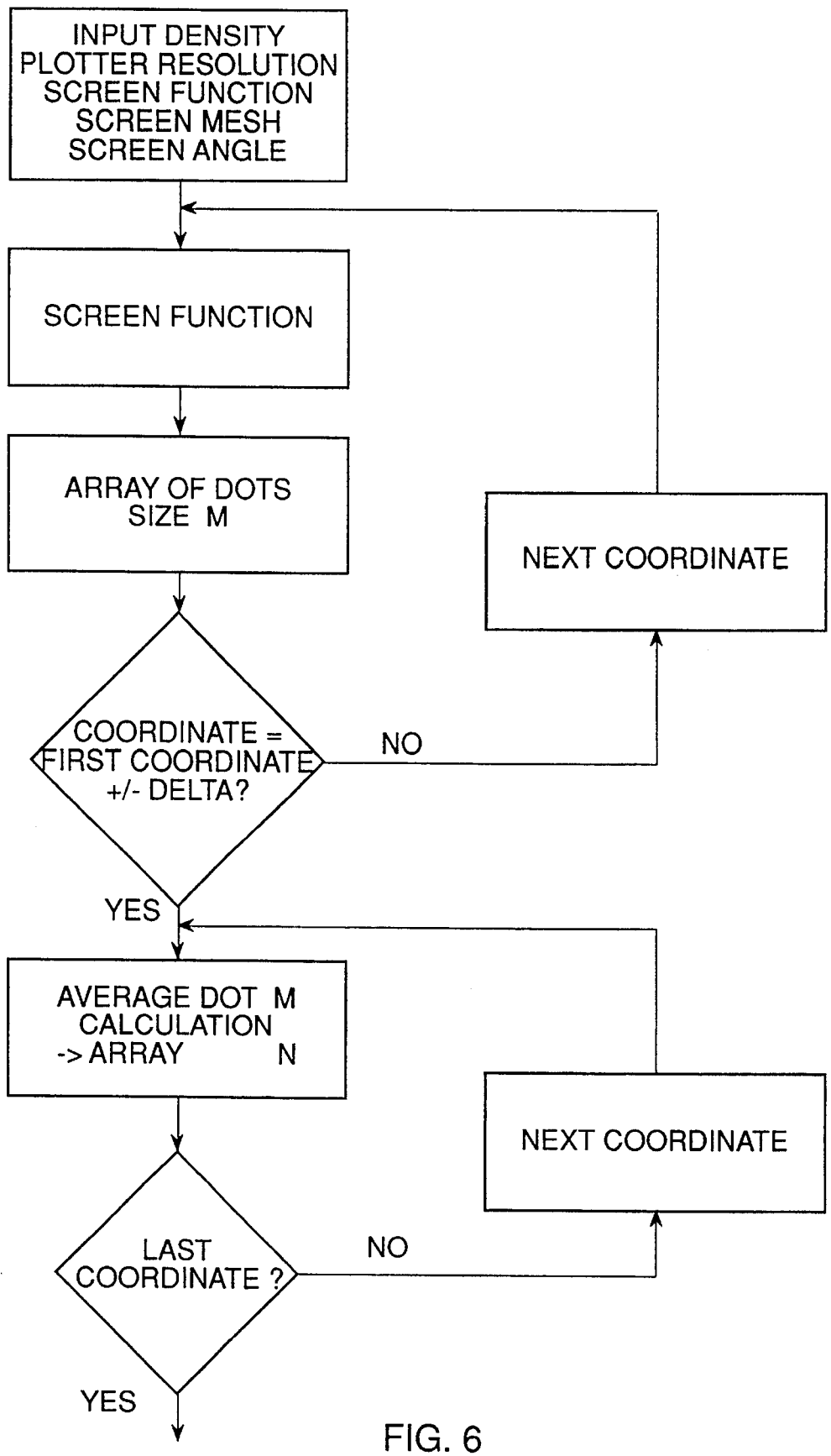
FIGS. 6, 7 and 8 are more detailed flow charts, each showing in enhanced detail, part of the operation of the invention illustrated in FIG. 5.

Reference is now made to FIG. 6, which is a more detailed exposition of step A above.

The initial stage of step A is receiving the following parameters: Input Density, Plotter Resolution, Screen Function, Screen Mesh and Screen Angle.

The screen function is operated coordinate-by-coordinate to create an array of dots of size M.

An averaging calculation is carried out on the array of size M to obtain an average dot shape, which is typically of size N, where N<<M. This array of size N is employed hereinafter as the "average dot or group of dots".

Figure 7:
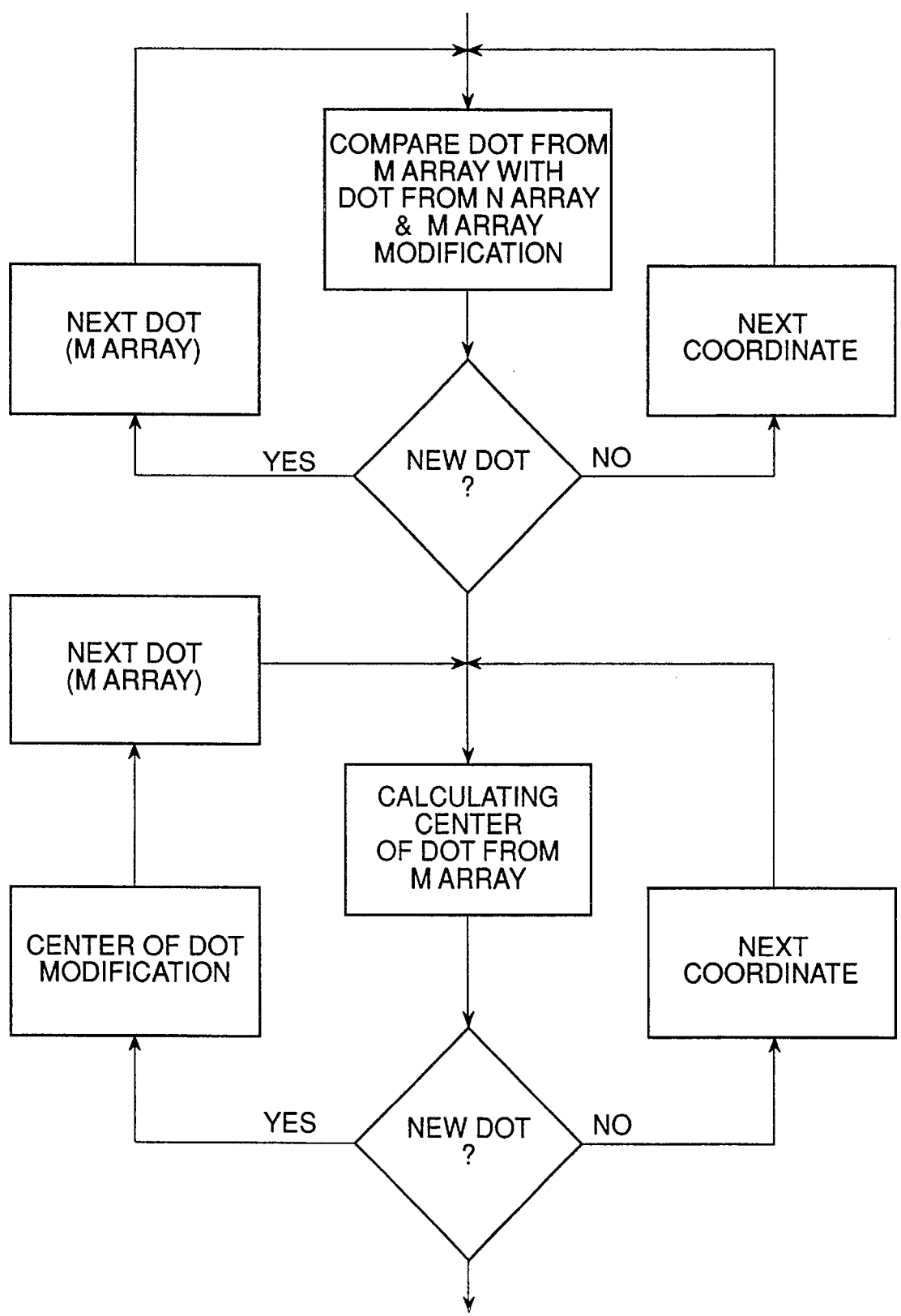

Reference is now made to FIG. 7, which illustrates step B. Each dot in the array of size M is compared with the dot configuration in the array of size N, which represents the average dot or group of dots. Based on the comparison, each of the dots in the array of size M is modified to approach the configuration of the average dot or group of dots in the array of size N.

Next, the thus modified dots or groups of dots of the array of size M are inspected to determine their respective centers. Based on the results of this inspection, the configurations of the modified dots or groups of dots are further modified to approach a situation wherein the centers of each dot and group of dots are uniformly located.

Figure 8:
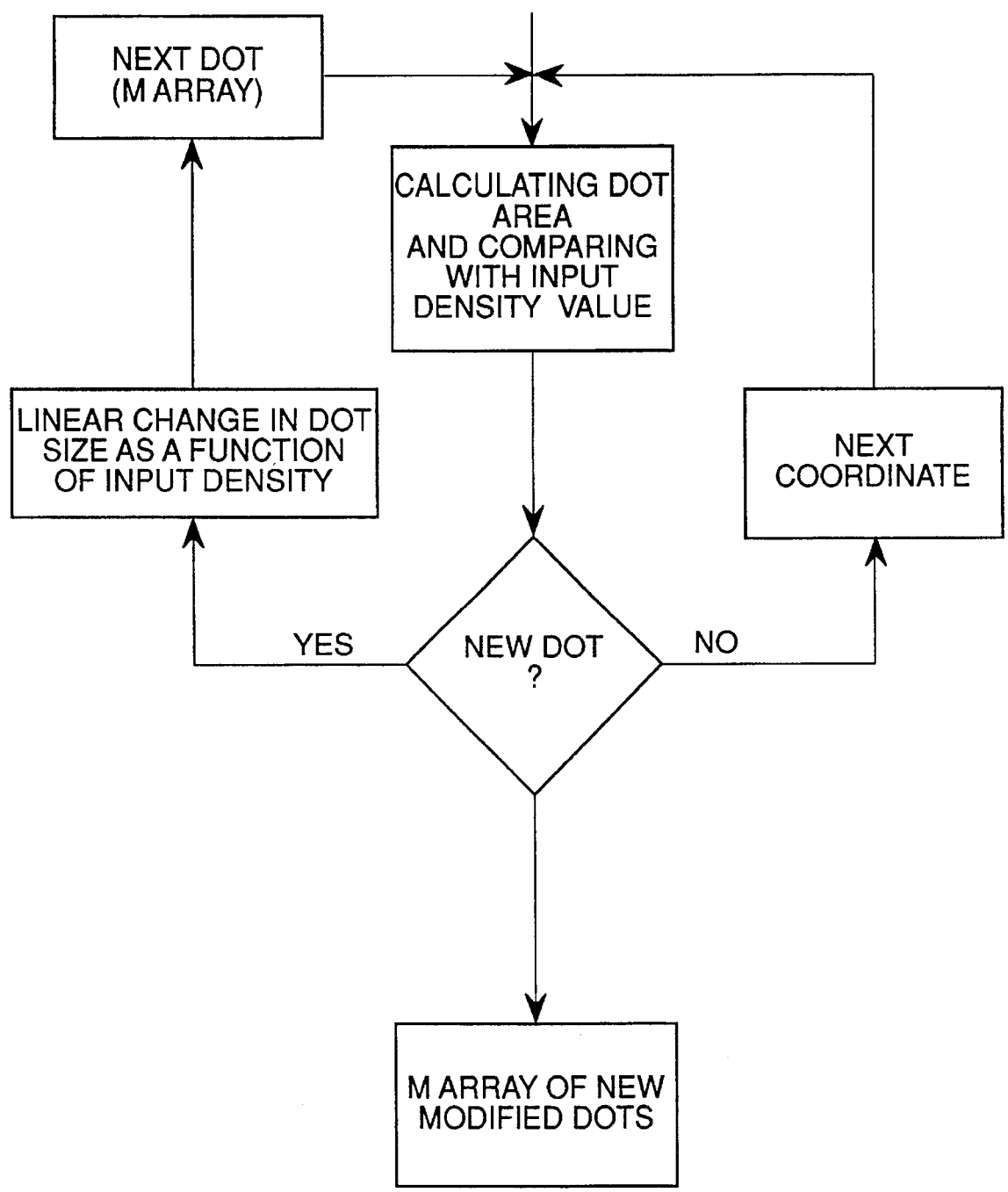

Reference is now made to FIG. 8, which illustrates step C. The twice modified dots provided by step B are inspected to determine their area. On the basis of the results of this inspection, the areas of the twice modified dots or groups of dots are further modified to provide dots which exhibit a generally linear change in dot size as a function of input density.

The result of steps A, B and C is an array of size M of thrice modified dots, which are generally free of repeated artifacts arising from the lack of coordination between the coordinate systems of a plotter and those of screening information used to generate a screen.

Figures 9A, 9B:
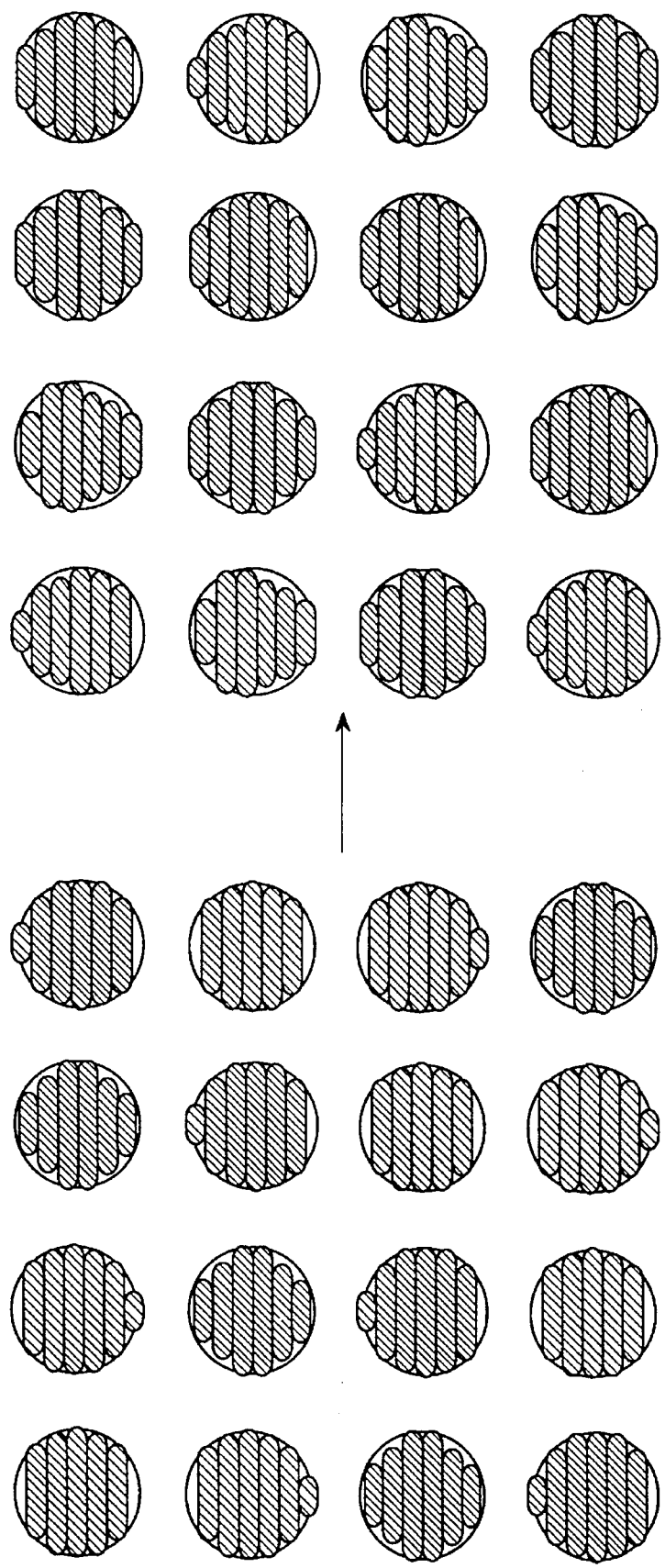
FIGS. 9A and 9B each show modification of a dot shape in accordance with the teachings of the present invention.

Reference is now made to FIGS. 9A and 9B which show examples of the operation of the present invention. The dots at the left side of FIGS. 9A and 9B have an unmodified configuration, while the dots on the right side of FIGS. 9A and 9B have a thrice modified configuration, namely, their configuration, center location and size have been modified towards uniformity.

Figure 10A:
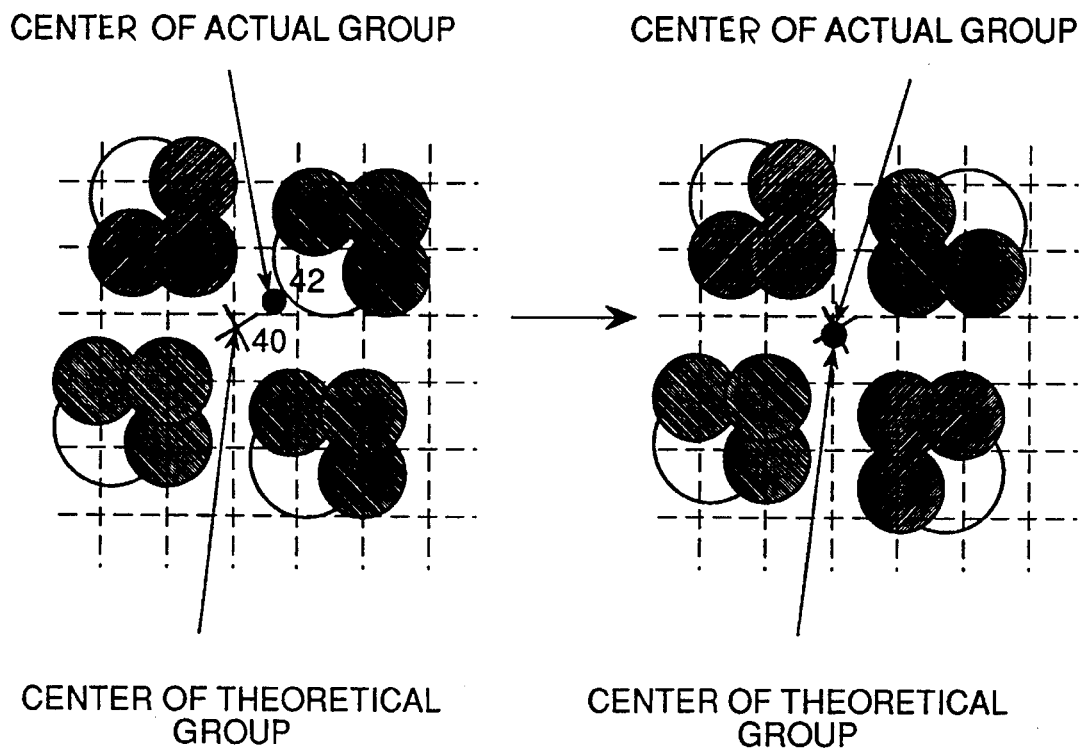
FIGS. 10A and 10B each show modification of a group of dots in accordance with the teachings of the present invention.
Figure 10B:
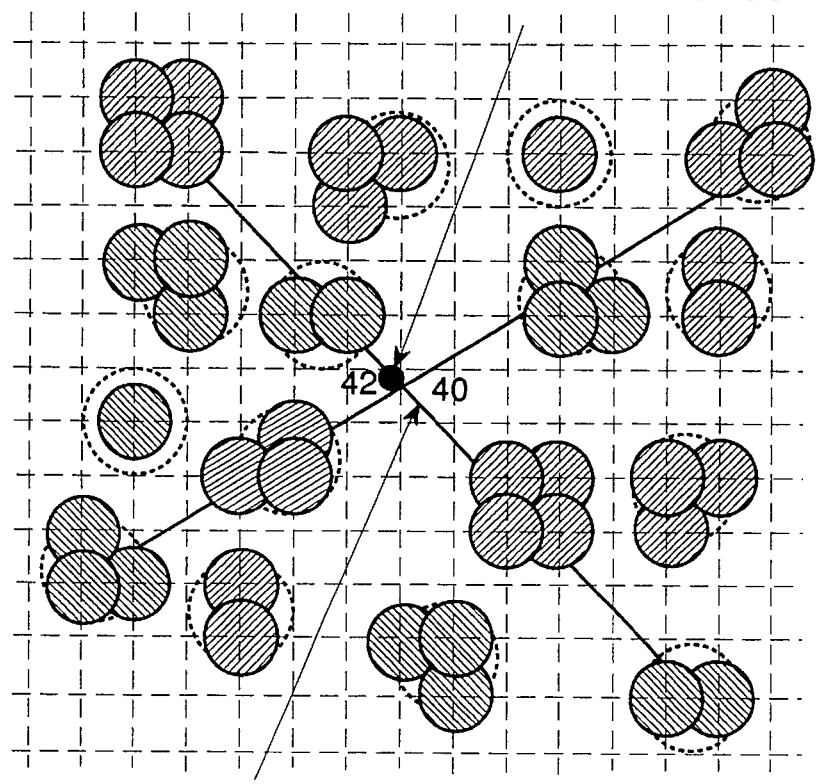
Figure 10B:
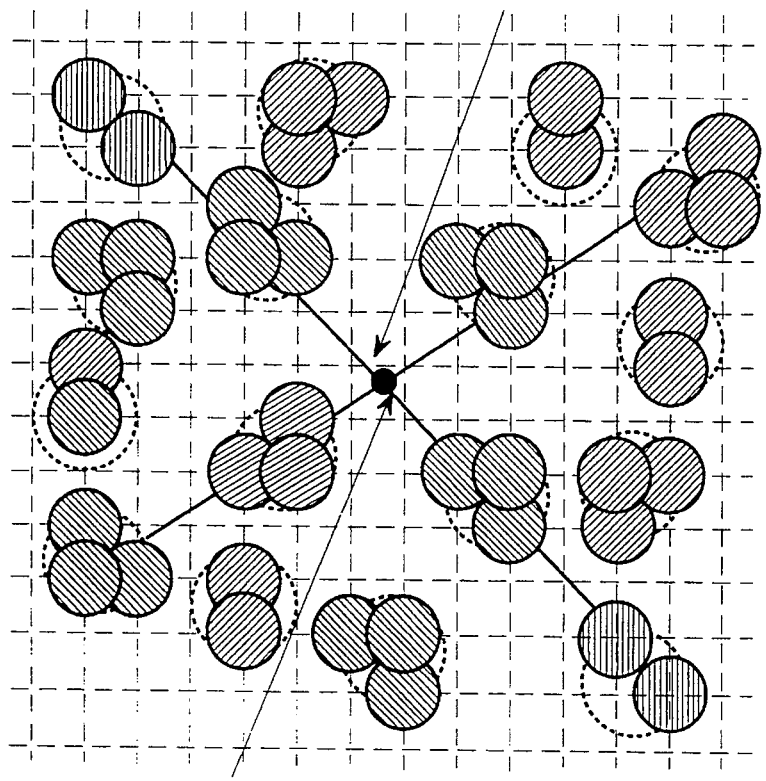

Reference is now made to FIGS. 10A and 10B which show examples of the operation of the present invention. The groups of groups of dots at the left side of FIG. 10A and and top drawing of FIG. 10B have an unmodified configuration, while the groups of dots on the right side of FIG. 10A and lower drawing of FIG. 10B have a thrice modified configuration, namely, their configuration, center location and size have been modified towards uniformity. In both figures, the center of the theoretical group of dots is indicated by reference numeral 40 and the center of the actual group of dots is indicated by reference numeral 42.

Figure 11:
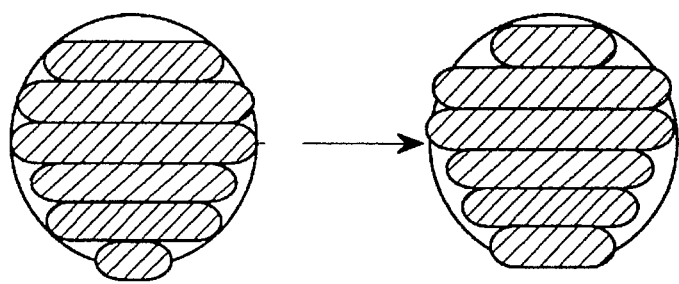
FIG. 11 shows the modification of part of a screened image in accordance with the teachings of the present invention.
Figure 11:
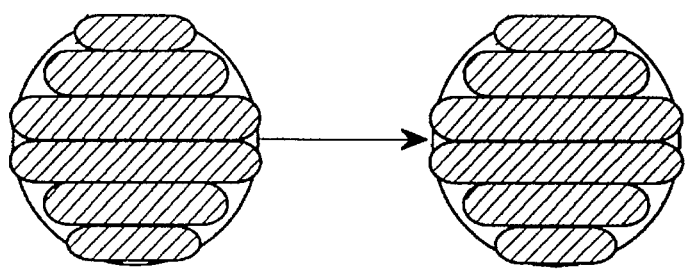

FIG. 11 illustrates the effects shown in FIGS. 9A and 9B over part of a screen. Although the improvements due to the present invention cannot readily be seen by an untrained person with the naked eye, it is appreciated that the dot array is significantly improved from the standpoint of reduction in repeated artifacts.

It will be appreciated by persons skilled in the art that the present invention is not limited by what has been particularly shown and described hereinabove. Rather, the scope of the present invention is defined only by the claims which follow:

I claim:

1. Apparatus for generating a screened reproduction of an image comprising:

apparatus receiving input density values of an original and coordinate information and storing screening Information for providing an operating input to a plotter enabling the plotter to provide an array of dots forming a screened image of the original, each dot being formed by a number of plotter lines, said apparatus being characterized In that it Includes apparatus for modifying at least one of the input density values, the coordinate information and the screening information, thereby to provide an operating input generally free of repeated artifacts arising from the lack of coordination between the coordinate systems of the plotter and those of the screening information, wherein said apparatus for modifying is operative to maintain a uniform number of said plotter lines in each said dot for a when input density.

2. Apparatus according to claim 1 and wherein said apparatus for modifying is operative to maintain the center of each dot at a uniform location within the dot for a given input density.

3. Apparatus according to claim 1 and wherein said apparatus for modifying is operative to maintain the percentage of exposed area per dot uniform for each given input density.

4. Apparatus for generating a screened reproduction of an image comprising:

a plotter apparatus receiving input density values of an original and coordinate information and storing screening information for providing an operating input to said plotter enabling the plotter to provide an array of dots forming a screened Image of the original, each dot being formed by a number of plotter lines, said apparatus being characterized In that it includes apparatus for modifying at least one of the Input density values, the coordinate information, the operation characteristics of the plotter and the screening information, thereby to provide an operating input generally free of repeated artifacts arising from the lack of coordination between the coordinate systems of the plotter and those of the screening information, wherein said apparatus for modifying is operative to maintain a uniform number of said plotter lines in each said dot for a given input density.

5. Apparatus according to claim 4 and wherein said apparatus for modifying is operative to maintain the center of each dot at a uniform location within the dot for a given input density.

6. Apparatus according to claim 4 and wherein said apparatus for modifying is operative to maintain the percentage of exposed area per dot uniform for each given input density.

7. A method for generative a screened reproduction of an image comprising the steps of:

receiving Input density values of an original and coordinate information and storing screening information for providing an operating input to a plotter enabling the plotter to provide an array of dots forming a screened image of the original, each dot being formed by a number of plotter lines, the method being characterized in that it includes the step of modifying at least one of the input density values, the coordinate information and the screening information, thereby to provide an operating input generally free of repeated artifacts arising form the lack of coordination between the coordinate systems of the plotter and those of the screening information, wherein said modifying step operative to maintain a uniform number of said plotter lines in each said dot for a given input density.

8. A method according to claim 7 and wherein said modifying step is operative to maintain the center of each dot at a uniform location within the dot for a given input density.

9. A method according to claim 7 and wherein said modifying step is operative to maintain the percentage of exposed area per dot uniform for each given input density.

10. A method for generating a screened reproduction of an image comprising receiving input density values of an original and coordinate information and storing screening information for providing an operating input to a plotter enabling the plotter to provide an array of dots forming a screened image of the original, each dot being formed by a number of plotter lines the method being characterized in that it includes the step of modifying at least one of the input density values, the coordinate information, the operational characteristics of the plotter and the screening information, thereby to provide an operating input generally free of repeated artifacts arising form the lack of coordination between the coordinated systems of the plotter and those of the screening information, wherein said modifying step is operative to maintain a uniform number of said plotter lines in each said dot for a given input density.

11. A method according to claim 10 and wherein said modifying step is operative to maintain the center of each dot at a uniform location within the dot for a given input density.

12. A method according to claim 10 and wherein said modifying step is operative to maintain the percentage of exposed area per dot uniform for each given input density.

* * * * *